United States Patent
Kaltenmaier

(10) Patent No.: US 9,855,931 B2
(45) Date of Patent: Jan. 2, 2018

(54) ACTIVATION DEVICE FOR A PARKING BRAKE

(71) Applicant: Power-Cast Light Metal Solutions GmbH & Co. KG, Schlierbach (DE)

(72) Inventor: Wolfgang Kaltenmaier, Gruibingen (DE)

(73) Assignee: Power-Cast Light Metal Solutions GmbH & Co. KG, Schlierbach (DE)

( * ) Notice: Subject to any disclaimer, the term of this patent is extended or adjusted under 35 U.S.C. 154(b) by 0 days.

(21) Appl. No.: 15/115,305

(22) PCT Filed: Jan. 30, 2015

(86) PCT No.: PCT/EP2015/051876
§ 371 (c)(1),
(2) Date: Jul. 29, 2016

(87) PCT Pub. No.: WO2015/124398
PCT Pub. Date: Aug. 27, 2015

(65) Prior Publication Data
US 2017/0001608 A1    Jan. 5, 2017

(30) Foreign Application Priority Data
Feb. 21, 2014   (DE) .................... 20 2014 100 780 U

(51) Int. Cl.
*G05G 1/04*     (2006.01)
*B60T 7/08*     (2006.01)
*B60T 7/10*     (2006.01)

(52) U.S. Cl.
CPC ............... *B60T 7/105* (2013.01); *G05G 1/04* (2013.01)

(58) Field of Classification Search
CPC .......... B60T 7/08; B60T 7/105; F16K 31/602; G05G 1/04; G05G 1/12; G05G 5/24
See application file for complete search history.

(56) References Cited

U.S. PATENT DOCUMENTS

| | | | |
|---|---|---|---|
| 7,475,615 B2 * | 1/2009 | Revelis ................... | B60T 7/104 74/523 |
| 8,813,601 B2 * | 8/2014 | Hind ....................... | B60T 7/104 74/523 |

(Continued)

FOREIGN PATENT DOCUMENTS

| | | |
|---|---|---|
| DE | 10006832 A1 | 9/2001 |
| DE | 102006010853 A1 | 9/2007 |

(Continued)

*Primary Examiner* — Adam D Rogers
(74) *Attorney, Agent, or Firm* — Michael Soderman

(57) ABSTRACT

The invention relates to an activation device (1) for a parking brake and is comprised of a bearing block (3), a parking brake lever (2) and a swivel bearing. The parking brake lever (2) is swivel-mounted on the bearing block (3) via the swivel bearing. The parking brake lever (2) can be fixed in place in a swivel position on the bearing block (3) with a blocking device. The swivel bearing is formed by an axle receptacle (5) and two inserts (6) allocated to it; the axle receptacle (5) is made of a die-cast part and has a limiting element (7). To form the swivel bearing, the inserts (6) are fixed in position at opposite ends of the axle receptacle (5). The inserts are in an operative connection with the limiting element (7), connected to it or connected to one another.

13 Claims, 2 Drawing Sheets

(56) References Cited

U.S. PATENT DOCUMENTS

| | | | | |
|---|---|---|---|---|
| 8,875,595 | B2* | 11/2014 | Barcin | B60T 7/102 |
| | | | | 74/523 |
| 9,410,612 | B2* | 8/2016 | Jeong | F16H 59/0278 |
| 2014/0053673 | A1* | 2/2014 | Choi | F16H 59/10 |
| | | | | 74/473.3 |
| 2017/0001606 | A1* | 1/2017 | Kaltenmaier | B60T 7/102 |
| 2017/0001607 | A1* | 1/2017 | Kaltenmaier | B60T 7/102 |
| 2017/0001609 | A1* | 1/2017 | Kaltenmaier | B60T 7/08 |

FOREIGN PATENT DOCUMENTS

| | | |
|---|---|---|
| DE | 102009022460 A1 | 11/2010 |
| EP | 1300306 A1 | 4/2003 |

* cited by examiner

ACTIVATION DEVICE FOR A PARKING BRAKE

CROSS REFERENCE TO RELATED APPLICATIONS

This application is the U.S. national stage of International Application No. PCT/EP2015/051876, filed on Jan. 30, 2015. The international application claims the priority of DE 202014100780.6 filed on Feb. 21, 2014; all applications are incorporated by reference herein in their entirety.

BACKGROUND

The invention relates to an activation device.

An activation device of that type is known from DE 10 2009 022 460 A1, for instance. This activation device is comprised of a parking brake lever swivel-mounted on a bearing block; the parking brake lever can be fixed in place in a specified swivel position via a blocking device. Furthermore, the activation device is comprised of an actuation rod that is held in the parking brake lever and that is in an operative connection with the blocking device. A tube-shaped receptacle that is swivel-mounted to the bearing block is provided to form a swivel bearing that is firmly connected to the parking brake lever and that supports a transmission element by means of which the swivel position of the parking brake lever can be transmitted to the parking brake. Two bearing bushings are inserted into the hollow area of the tube-shaped receptacle and fixed in position at the respective ends of the hollow area. A bearing tube is then inserted into the hollow area; it is also inserted into holes of the bearing block and peened there.

A drawback with regard to this swivel bearing is its complex structure. The assembly of the swivel bearing is also undesirably complex because of the high number of individual parts and the required peening of the bearing tube as an additional assembly step.

An activation device for a parking brake that has a parking brake lever swivel-mounted on a bearing block and a blocking device is known from DE 10 2006 010 853 A1. The blocking device is comprised of a locking segment arranged on the bearing block and a movably mounted pawl. An actuation rod coupled to the pawl is provided in the parking brake lever. To form the swivel bearing of the parking brake lever, bearing pins arranged on it reach into bearing bushings that are clipped onto the bearing block.

The swivel bearing is, in fact, comprised of few individual parts in this case. A drawback here is that the bearing bushings clipped onto the bearing block do not have sufficient stability to securely support the parking brake lever.

SUMMARY

The invention relates to an activation device (1) for a parking brake and is comprised of a bearing block (3), a parking brake lever (2) and a swivel bearing. The parking brake lever (2) is swivel-mounted on the bearing block (3) via the swivel bearing. The parking brake lever (2) can be fixed in place in a swivel position on the bearing block (3) with a blocking device. The swivel bearing is formed by an axle receptacle (5) and two inserts (6) allocated to it; the axle receptacle (5) is made of a die-cast part and has a limiting element (7). To form the swivel bearing, the inserts (6) are fixed in position at opposite ends of the axle receptacle (5). The inserts are in an operative connection with the limiting element (7), connected to it or connected to one another.

DETAILED DESCRIPTION

The invention is based on the objective of providing an activation device of the type mentioned at the outset that has a high level of functionality with low construction expenses.

Advantageous embodiments and useful design developments of the invention are described in the sub-claims.

The invention relates to an activation device for a parking brake and is comprised of a bearing block, a parking brake lever and a swivel bearing. The parking brake lever is swivel-mounted on the bearing block via the swivel bearing. The parking brake lever can be fixed in place in a swivel position on the bearing block with a blocking device. The swivel bearing is formed by an axle receptacle and two inserts allocated to it; the axle receptacle is made of a die-cast part and has a limiting element. To form the swivel bearing, the inserts are fixed in position at opposite ends of the axle receptacle. The inserts are in an operative connection with the limiting element, connected to it or connected to one another.

A major advantage of the invention is that a swivel bearing is created with a small number of individual parts by means of which the parking brake lever can be swiveled on the bearing block. A further advantage is that the swivel bearing can be assembled quickly and with few assembly steps. In particular, the swivel bearing can be advantageously designed to the effect that it can be assembled without tools.

Another major advantage is that a stable swivel bearing is provided with the axle receptacle and the inserts; it is especially advantageous that a secure hold on the bearing block exists.

Because of the design of the axle receptacle as a die-cast part, it can be manufactured in a precise and low-tolerance way, which is an essential prerequisite for a reproducible design of the swivel bearing. The die-cast part is comprised in general of a metallic material, in particular aluminum. The inserts allocated to the axle receptacle are advantageously made of plastic and can thus be manufactured in an especially economical fashion. In particular, the inserts are designed as plastic injection-molded parts that are manufactured with very high precision like the axle receptacle.

The fact that the axle receptacle establishes the geometry of the swivel bearing is important with regard to the swivel bearing as per the invention; the axle receptacle has a high level of stability and dimensional precision because of the design in the form of a die-cast part. Furthermore, a precise reference point for the assembly positions of the inserts is established by the limiting element as a component of the die-cast part.

The inserts can be mounted on the axle receptacle by simply affixing, inserting or placing them on the axle receptacle.

In accordance with a design form of the invention that is especially advantageous in terms of the design, the axle receptacle is designed with a tube shape; the inserts can be inserted into it at opposite ends of the axle receptacle.

The axle receptacle has an interior wall forming the boundary of a hollow area here; the limiting element is formed on it.

In particular, the axle receptacle has a hollow cylindrical shape.

The geometries of the inserts are then adapted to the geometry of the axle receptacle. Each insert advantageously has a cylindrical body part that is held in the hollow area of the axle receptacle with little play. A head part is provided at one end of the body part whose diameter is greater than the diameter of the hollow area.

It is especially advantageous when the inserts have an identical design.

The axle receptacle then has a corresponding mirror symmetry; the limiting element is located in the center of the axle receptacle that the mirror plane runs through.

In accordance with an especially advantageous embodiment of the invention, the axle receptacle and the parking brake lever are designed as one piece and formed by a die-cast part.

This embodiment is especially favorable in terms of manufacturing, since the number of individual parts of the activation device can be kept low due to the one-piece design of the axle receptacle and the parking brake lever.

In this embodiment, the axle receptacle with its inserts is swiveled together with the parking brake lever on the fixed bearing block when the parking brake is to be actuated with the activation device.

The inserts are advantageously held in holes of the bearing block; the parking brake lever is swivel-mounted on the bearing block because of that.

In principle, the axle receptacle can also be a component of the bearing block and then form a fixed part with the bearing block. In that case, the parking brake lever can have mounting lugs with holes; the inserts can then grip these holes of the parking brake lever to form the swivel bearing of the parking brake lever in that way.

The limiting element only constitutes in the simplest case a defined limit stop that the inserts are held against when they are mounted on the axle receptacle.

In the case that the axle receptacle has a tube-shaped design, this limit stop can be formed by a ring-shaped projection that stands out from the cylindrical interior wall that limits the hollow area of the axle receptacle.

In this case, the inserts preferably have fastening elements on their front ends by means of which the inserts can be connected to one another in contact with the limit stop. As an example, the fastening elements can constitute a bayonet joint.

Alternatively, separate fasteners can be provided by means of which the inserts that are inserted into the axle receptacle are connected.

In particular, the fasteners constitute screw connections.

In accordance with an advantageous design form of the invention, the limiting element is not just able to be a limit stop, but instead can also simultaneously form a fastening element for the inserts. As an example, the fasteners of the inserts can be designed in the form of locking hooks.

These locking hooks can then be engaged on the limiting element.

BRIEF DESCRIPTION OF THE DRAWINGS

The invention will be explained with the aid of the drawings below. The following are shown in the figures.

DETAILED DESCRIPTION OF THE PREFERRED EMBODIMENTS

Figure 1:
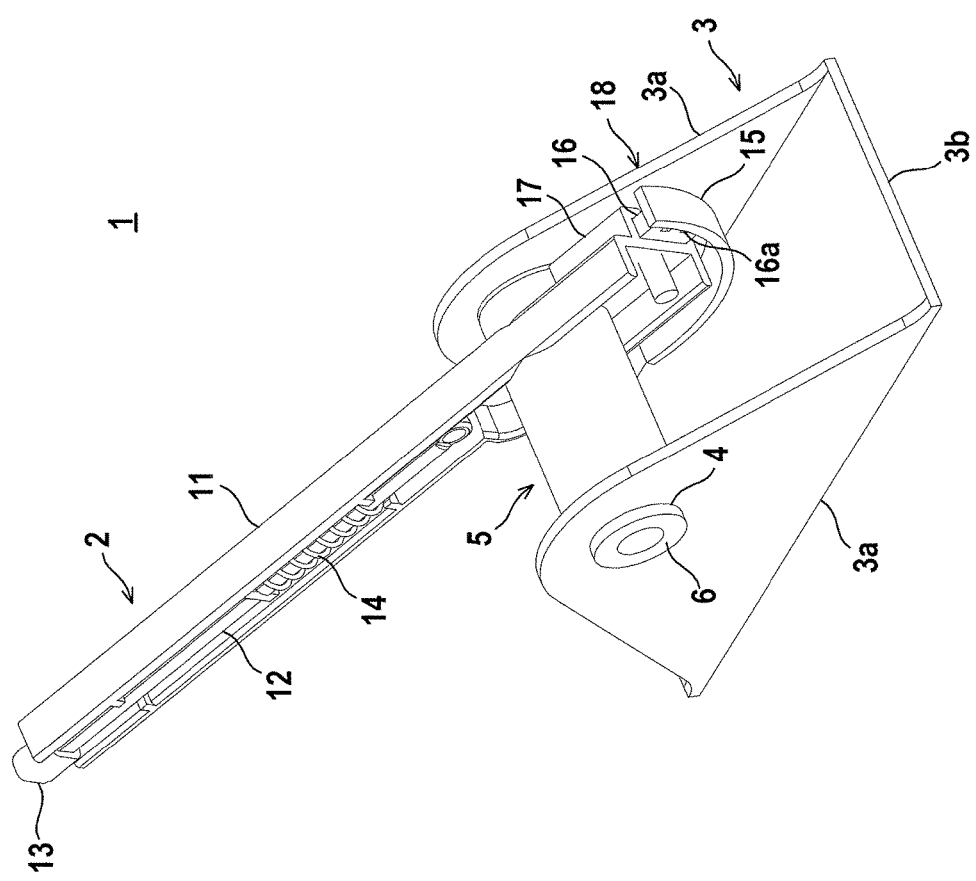
FIG. 1: Example of the activation device for a parking brake as per the invention.

FIG. 1 schematically shows an example of the activation device 1 as per the invention for a parking brake of a motor vehicle.

The activation device 1 is comprised of a parking brake lever 2 and a bearing block 3. The parking brake lever 2 is swivel-mounted around a horizontal axis on the bearing block 3. The bearing block 3 is comprised of two flanks 3a with identical designs and a base piece 3b. The identically designed flanks 3a run in parallel and at a distance to one another. The flanks 3a project at a right angle from the base piece 3b in each case and are designed to be one piece with it. Each flank 3a has a hole 4 as receptacles for a swivel bearing of the parking brake lever 2. The identically designed holes 4 are opposite one another.

Figure 2:
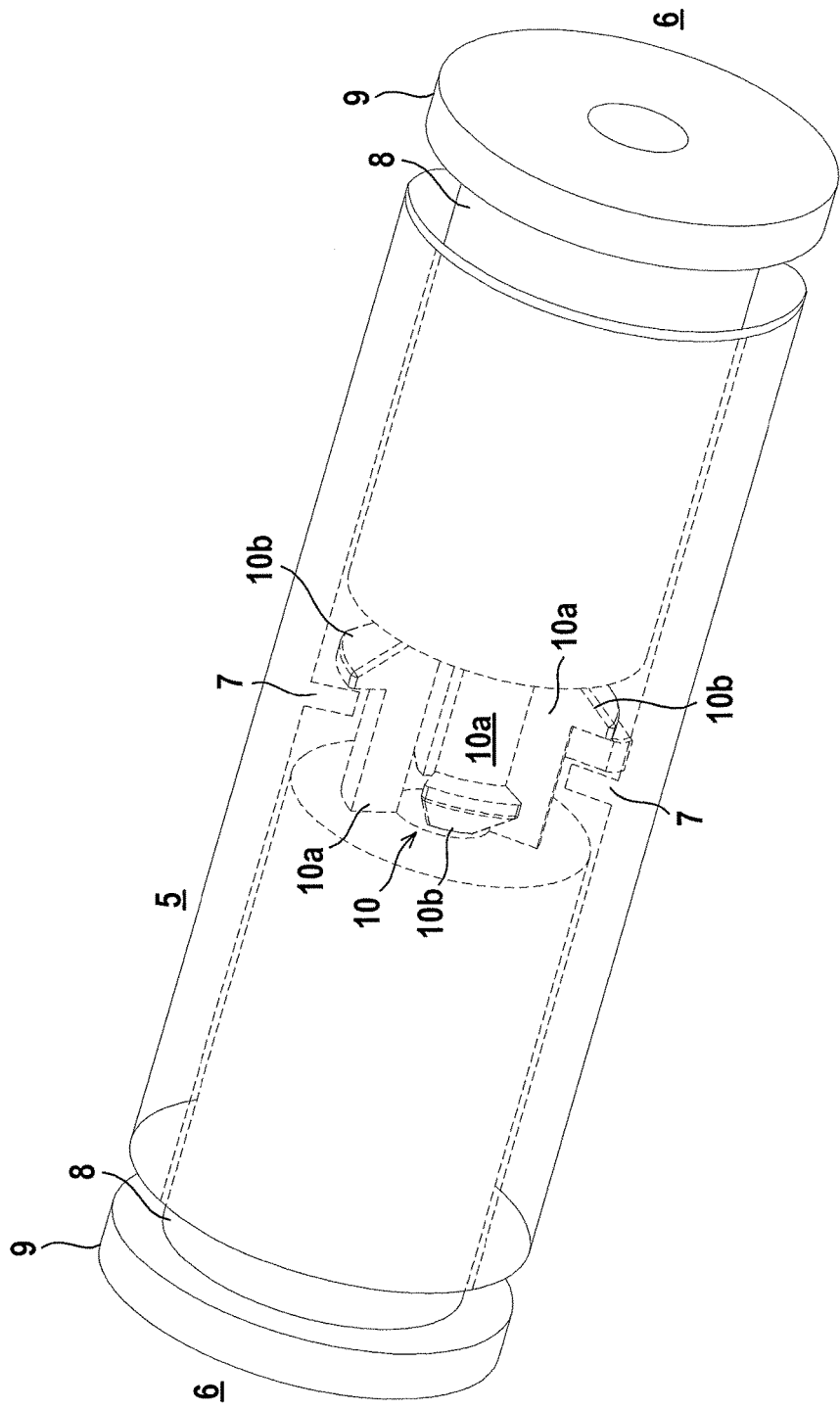
FIG. 2: Partial diagram of the activation device in accordance with FIG. 1 with the components of a swivel bearing for the parking brake lever of this activation device.

The swivel bearing as per the invention whose components are separately shown in FIG. 2 is comprised of a tube-shaped axle receptacle 5 and two inserts 6 allocated to it. The axle receptacle 5 is formed by a die-cast part. In the instant case, the axle receptacles 5 and the parking brake lever 2 are designed as one piece and are comprised of one die-cast part. The die-cast part is comprised of a metallic material, in particular magnesium or aluminum. The inserts 6 are designed as plastic injection-molded parts in this case.

The axle receptacle 5 has a hollow cylindrical shape; the parking brake lever 2 ends at its circular-cylindrical outer surface. The interior wall of the axle receptacle 5 that surrounds a hollow area likewise has a circular-cylindrical design. A ring-shaped projection that forms a limiting element 7 runs into this interior wall in the center of the axle receptacle 5. The limiting element 7 is a component of the die-cast part.

The inserts 6 have an identical design. Each insert 6 is comprised of a cylindrical body part 8 whose external diameter is adapted to the interior diameter of the hollow area of the axle receptacle 5. A disk-shaped head part 9 whose diameter is greater than the external diameter of the body part 8 is connected to the rear end of the body part 8.

Several locking hooks 10 with an identical design are provided at the front end of the insert 6. The longitudinal axes of the locking hooks 10 run in parallel with one another in the axial direction of the insert 6. Each locking hook 10 has an elongated, rod-shaped base body 10a and a detent lug 10b attached to its front end.

To assemble the swivel bearing, the axle receptacle 5 is inserted between the holes 4 of the bearing block 3 so that the hollow area of the axle receptacle 5 is connected to these holes 4. The inserts 6 are then inserted in each case into a hole 4 of the bearing block 3, to start with, and are then inserted into the hollow area of the axle receptacle 5 at its bordering, longitudinal end. The edge of the bearing block 3 limiting a hole 4 is consequently between the head part 9 of the respective insert 6 and the longitudinal edge of the axle receptacle 5. The lengths of the inserts 6 are adapted to the length of the axle receptacle 5 in such a way that the inserts 6 can be inserted just enough into the hollow area of the axle receptacle 5 in each case that the locking hooks 10 engage with the limiting element 7 of the axle receptacle 5. The base bodies 10a of the locking hooks 10 are elastically workable here, so they can bend up when the detent lug 10b is pushed over the limiting element 7. As soon as the detent lugs 10b engage behind the limiting element 7, the inserts 6 are attached to the limiting element 7, meaning that the limiting element 7 also forms a fastening element to which the inserts 6 are attached with the locking hooks 10.

The body part 8 of the insert 6 inserted into the axle receptacle 5 is held in the hollow area of the axle receptacle 5 with little play. The locking hooks 10 of the inserts 6 are arranged at distances to one another in such a way, when the insert 6 is fixed in place on the limiting element 7, that the locking hooks 10 of an insert 6 are right in the gaps between two locking hooks 10 of the other insert 6. Furthermore, when the insert 6 is fastened to the limiting element 7, the distance between a longitudinal edge of the axle receptacle 5 and the head part 9 of an insert 6 is dimensioned in such a way that the flank 3a of the bearing block 3 lying in between is held with little play. Consequently, the parking brake lever 2 can be swiveled with the axle receptacle 5 with little friction on the bearing block 3.

The respective swivel position of the parking brake lever 2 is transferred via a pull rod or the like, which is not shown, to the parking brake, likewise not shown, of the motor vehicle in which the activation device 1 is installed.

The parking brake lever 2 has a rod-shaped base body 11 that is designed to be one piece with the axle receptacle 5 or that is at least connected to it in a fixed way. The base body 11 is formed by a laterally open profile in this case. An actuation rod 12 is mounted in the elongated front area of the base body 11 that projects over the bearing block 3. A button 13 projecting over the front end of the base body 11 is mounted on the front end of the actuation rod 12. The actuation rod 12 can be moved by actuating the button 13 against the spring force of a spring 14 that is mounted in the base body 11 and that surrounds the actuation rod 12. As soon as the button 13 is released, the actuation rod 12 is moved back again into its starting position by the spring force of the spring 10.

The parking brake lever 2, in particular its base body 11, is covered when fully assembled with a lining, not shown, whose front portion forms a handle; an operator grips the parking brake lever 2 with this to swivel it.

A blocking device 18 is provided to fix the parking brake lever 2 in place in a specific swivel position. The blocking device is comprised of a locking segment 15 on the bearing block 3 and a pawl 16 on the parking brake lever 2.

The pawl 16 is comprised in the instant case of a plastic injection-molded part. The pawl 16 has several ratchet teeth 16a (FIG. 4a) on its front edge that is turned towards the locking segment 15. The pawl 16 is mounted so as to be movable in the axial direction in a receptacle 17 that is a component of the parking brake lever 2 and that is laterally connected to its base body 11. The direction of motion of the pawl 16 runs in parallel with the direction of motion of the actuation rod 12. The pawl 16 is connected to the actuation rod 12 via a coupling element that is not separately shown. When the button 13 is pressed by an operator, the pawl 16 is inserted into the receptacle 17 because of the excursion of the actuation rod 12 caused by that. If the operator releases the button 13, the pawl 16 is pushed out of the receptacle 17 again via the return movement of the actuation rod 12.

The locking segment 15 is arranged on the inside surface of a flank 3a of the bearing block 3 and, in fact, to the effect that the locking segment 15 is opposite the pawl 16 at a short distance.

The locking segment 15 has internal teeth on a concave, circular-cylindrical surface on the inside surface of the locking segment 15 that is turned towards the pawl 16.

The blocking device of the activation device 1 in accordance with FIG. 1 operates in such a way that when the button 13 is not actuated, the actuation rod 12 exerts a force via the spring 14 on the pawl 16 so that it is pushed out of the receptacle 17 and pressed with contact pressure against the locking segment 15, so the ratchet teeth 16a of the pawl 16 engage with the teeth of a partial area of the toothing of the locking segment 15. The parking brake lever 2 is fixed in place in a swivel position on the bearing block 3 because of that.

If the blocking device is to be released so that the parking brake lever 2 can be put into a different swivel position, an operator presses the button 13. The movement of the actuation rod 12 caused by that is converted via the coupling element into a linear movement of the pawl 16 to the effect that this pawl 16 is moved into the receptacle 17 and the ratchet teeth 16a of the pawl 16 are consequently no longer engaged with the teeth of the locking segment 15. The operator can then swivel the parking brake lever 2 into the new desired swivel position. After that, the operator releases the button 13. The actuation rod 12 is moved into its starting position by the spring force of the spring 14 because of that, causing the pawl 16 to be moved against the locking segment 15 so that the ratchet teeth 16a of the pawl 16 are pressed with contact pressure against teeth of a new partial area of the toothing. The new swivel position of the parking brake lever 2 is thereby fixed in place.

The parking brake can be released by putting the parking brake lever 2 into a swivel position constituting a neutral position. The parking brake can be tightened, meaning actuated, by swiveling the parking brake lever 2 into a swivel position that is preferably above the neutral position.

LIST OF REFERENCE NUMERALS (1) Activation device
(2) Parking brake lever
(3) Bearing block
(3a) Flank
(3b) Base piece
(4) Hole
(5) Axle receptacle
(6) Insert
(7) Limiting element
(8) Body part
(9) Head part
(10) Locking hook
(10a) Base body
(10b) Detent lug
(11) Base body
(12) Actuation rod
(13) Button
(14) Spring
(15) Locking segment
(16) Pawl
(16a) Ratchet teeth
(17) Receptacle
(18) Blocking device

The invention claimed is:

1. An activation device (1) for a parking brake comprising a bearing block (3), a parking brake lever (2) and a swivel bearing, via which the parking brake lever (2) is swivel-mounted on the bearing block (3), and with a blocking device, via which the parking brake lever (2) can be fixed in place in a swivel position on the bearing block (3), characterized in that the swivel bearing is formed by an axle receptacle (5) and two inserts (6) attached to said axle receptacle, wherein the axle receptacle (5) has a limiting element (7), wherein the inserts (6) are fixed in position at opposite ends of the axle receptacle (5) to form the swivel bearing, wherein the inserts (6) are in an operative connection with the limiting element (7), connected to said limiting element or connected to one another, and wherein the axle receptacle (5) has an interior wall, which forms a boundary of a hollow area, on which the limiting element (7) is formed.

2. The activation device (1) according to claim 1, characterized in that the axle receptacle (5) is cylindrical, wherein the inserts (6) can be inserted into the axle receptacle at opposite ends of the axle receptacle (5).

3. The activation device according to claim 2, characterized in that the axle receptacle (5) has a hollow cylindrical shape.

4. The activation device according to claim 2, characterized in that each insert (6) has a cylindrical body part (8) that is held in the hollow area of the axle receptacle (5) and that a head part (9) is provided at one end of the body part (8) whose diameter is greater than the largest diameter of the hollow area.

5. The activation device according to claim 1, characterized in that the inserts (6) have an identical design.

6. The activation device according to claim 1, characterized in that the limiting element (7) forms a limit stop for both of the inserts (6).

7. The activation device according to claim 1, characterized in that the limiting element (7) forms a fastening element to fix the inserts (6) in place.

8. The activation device according to claim 1, characterized in that at least one fastening element is provided on each of the inserts (6), wherein the inserts (6) are fastened to the limiting element (7) with their respective at least one fastening element or the inserts (6) are connected to one another with their respective at least one fastening element.

9. The activation device according to claim 8, characterized in that the at least one fastening element provided on each of the inserts is a locking hook (10).

10. The activation device according to claim 1, characterized in that fastener is formed on each of the inserts via which the inserts (6) inserted into the axle receptacle (5) are connected.

11. An activation device (1) for a parking brake comprising a bearing block (3), a parking brake lever (2) and a swivel bearing, via which the parking brake lever (2) is swivel-mounted on the bearing block (3), and with a blocking device, via which the parking brake lever (2) can be fixed in place in a swivel position on the bearing block (3), characterized in that the swivel bearing is formed by an axle receptacle (5) and two inserts (6) attached to said axle receptacle, wherein the axle receptacle (5) is made of a die-cast part and has a limiting element (7), wherein the inserts (6) are fixed in position at opposite ends of the axle receptacle (5) to form the swivel bearing, wherein the inserts (6) are in an operative connection with the limiting element (7), connected to said limiting element or connected to one another, and wherein the inserts (6) are made of plastic and that the axle receptacle (5) and the parking brake lever (2) are formed in one piece via a die-casting process.

12. The activation device according to claim 11, characterized in that the inserts (6) are held in holes (4) of the bearing block (3) so that the parking brake lever (2) is swivel-mounted on the bearing block (3).

13. An activation device (1) for a parking brake comprising a bearing block (3), a parking brake lever (2) and a swivel bearing, via which the parking brake lever (2) is swivel-mounted on the bearing block (3), and with a blocking device, via which the parking brake lever (2) can be fixed in place in a swivel position on the bearing block (3), characterized in that the swivel bearing is formed by an axle receptacle (5) and two inserts (6) attached to said axle receptacle, wherein the axle receptacle (5) is made of a die-cast part and has a limiting element (7), wherein the inserts (6) are fixed in position at opposite ends of the axle receptacle (5) to form the swivel bearing, wherein the inserts (6) are in an operative connection with the limiting element (7), connected to said limiting element or connected to one another, and wherein fastening elements of the inserts (6) constitute a bayonet joint.

* * * * *